US006643047B2

(12) United States Patent
Bhat et al.

(10) Patent No.: US 6,643,047 B2
(45) Date of Patent: Nov. 4, 2003

(54) METHOD AND APPARATUS FOR GENERATING AND CONTROLLING SPIN PROPAGATION USING ONE OR MORE COHERENT LIGHT BEAMS

(75) Inventors: Ravi D. R. Bhat, Toronto, CA (US); John Edward Sipe, Toronto (CA); Henry Martin Van Driel, Mississauga (CA)

(73) Assignees: Ravi Bhat, Toronto (CA); John Sipe, Toronto (CA); Henry Van Driel, Mississauga (CA)

( * ) Notice: Subject to any disclaimer, the term of this patent is extended or adjusted under 35 U.S.C. 154(b) by 12 days.

(21) Appl. No.: 10/103,147

(22) Filed: Mar. 22, 2002

(65) Prior Publication Data

US 2002/0135852 A1 Sep. 26, 2002

Related U.S. Application Data

(60) Provisional application No. 60/277,630, filed on Mar. 22, 2001.

(51) Int. Cl.[7] .................................................. G02F 1/83
(52) U.S. Cl. ...................................... 359/248; 359/237
(58) Field of Search ................................ 359/248, 246, 359/251, 237; 372/44; 257/21, 22, 18

(56) References Cited

U.S. PATENT DOCUMENTS 5,523,572 A * 6/1996 Nakanishi et al. ....... 250/423 P
5,790,296 A * 8/1998 Sipe et al. .................. 359/248
5,834,791 A * 11/1998 Nakanishi et al. ............ 257/11
5,877,510 A * 3/1999 Baba et al. ................... 257/21

OTHER PUBLICATIONS

Bhat and Sipe, Phys. Rev. Lett. vol. 85, No. 25, p. 5432, Dec. 2000.*
Awschalom, David D., Kikkawa, James M., "Electron Spin and Optical Coherence in Semiconductors", Jun. 1999, Physics Today, pp. 33–38.
Hache, A., Kostoulas, Y., Atanasov, R., Hughes, J. L. P., Sipe, J.E. and van Driel H. M., "Observation of Coherently Controlled Photocurrent in Unbiased, Bulk GaAs", Jan. 13, 1997, Physical Review Letters, vol. 78, No. 2, pp. 306–309.

(List continued on next page.)

Primary Examiner—Scott J. Sugarman
Assistant Examiner—Richard Hanig
(74) Attorney, Agent, or Firm—Lynn C. Shumacher; Hill & Shumacher (57) ABSTRACT

The present invention uses quantum interference of one and two photon absorption from a multiple color fields to optically inject ballistic spin currents in unbiased photoconductors. The spin currents can be generated with and without an accompanying electrical current and can be controlled using the relative phase of the colors. In one aspect of the there is provided a method of generating spin currents in a photoconductor material comprising producing a first coherent light beam having a first frequency $\omega_1$ and a second coherent light beam having a frequency twice the first frequency $2\omega_1$, polarizing the first and second coherent light beams to have a preselected polarization with respect to each other, and simultaneously irradiating a selected region of the photoconductor material with the first coherent light beam and the second coherent light beam to generate a spin current in the photoconductor. When the photoconductor has a noncentrosymmetric zincblende ($T_d$ symmetry) crystal structure a single coherent light beam can be used to obtain pure spin currents and mixed electrical and spin, currents may be produced when the photoconductor has a wurtzite structure.

28 Claims, 4 Drawing Sheets

OTHER PUBLICATIONS

Laman, N., Shkrebtii, A. I., Sipe, J. E., and van Driel, H. M., "Quantum Interference Control of Currents in CdSe with a Single Optical Beam", Oct. 25, 1999, Applied Physics Letters, vol. 75, No. 17, pp. 2581–2583.

Atanasov, R., Hache, A., Hughes, J. L. P., van Driel, H. M., and Sipe, J. E., "Coherent Control of Photocurrent Generation in Bulk Semiconductors", Mar. 4, 1996, Physical Review Letters, vol. 76, No. 10, pp. 1703–1706.

Kikkawa, J. M., Awschalom, D. D., "Lateral Drag of Spin Cohernce in Gallium Arsenide", Nov. 5, 1998, Letters to Nature.

Hammar P. R., Bennett, B. R., Yang, M. J., and Johnson, Mark, "Observation of Spin Injection at a Ferromagnet–Semiconductor Interface", Jul. 5, 1999, Physical Review Letters, vol. 83, No. 1, pp. 203–206.

Ohno, Y., Young, D. K., Beschoten, B., Matsukura, F., Ohno, H., and Awschalom, D. D., "Electrical Spin Injection in a Ferromagnetic Semiconductor Heterostructure", Nov. 5, 1999, Letters to Nature.

Hagele, D., Oestreich, M., Ruhle, W. W., Nestle, N., and Eberl, K., "Spin Transport in GaAs", Sep. 14, 1998, Applied Physics Letters, vol. 73, No. 11, pp. 1580–1582.

Fiederling, R., Keim, M., Reuscher, G., Ossau, W., Schmidt, G. Waag, A., Molenkamp, L. W., "Injection and Detection of a Spin–Polarized Current in a Light–emitting Diode", Oct. 19, 1999, Letters to Nature.

Oestreich, M., Hubner, J., Hagele, D., Klar, P. J., Heimbrodt, W., Ruhle, W. W., Ashenford, D. E., and Lunn, B., "Spin Injection into Semiconductors", Mar. 1, 1999, Applied Physics Letters, vol. 74, No. 9, pp. 1251–1253.

Ganichev, S. D., Ivchenko, E. L., Danilov, S. N., Eroms, J., Wegsheider, W., Weiss, D., and Prettl, W., "Conversion of Spin into Directed Electric Current in Quantum Wells", May 7, 2001, Physical Review Letters, vol. 86, No. 19, pp. 4358–4361.

Gardelis, S., Smith, C. G., Barnes, C. H. W., Linfield, E. H., and Ritchie, D. A., "Spin–Valve Effects in a Semiconductor Field–Effect Transistor: A Spintronic Device", Sep. 15, 1999–I, Physical Review B, vol. 60, No. 11, pp. 7764–7767.

\* cited by examiner

METHOD AND APPARATUS FOR GENERATING AND CONTROLLING SPIN PROPAGATION USING ONE OR MORE COHERENT LIGHT BEAMS

CROSS REFERENCE TO RELATED UNITED STATES PATENT APPLICATION

This patent application relates to U.S. Provisional patent application Serial No. 60/277,630 filed on Mar. 22, 2001, entitled METHOD AND APPARATUS FOR GENERATING AND CONTROLLING SPIN PROPAGATION USING MULTIPLE COHERENT LIGHT BEAMS.

FIELD OF THE INVENTION

This invention relates to a method and apparatus for the generation and control of spin currents, comprising spin polarized charge carriers, in photoconductors using one or more coherent light beams. More particularly the present invention provides a method of using the polarization properties of multiple coherent light beams, and phase differences between multiple coherent light beams, to control the magnitude and direction of spin currents in a photoconductor.

BACKGROUND OF THE INVENTION

The control of electronic spin in semiconductors is important for the study of spin dynamics in many-body systems and crucial for the development of new data storage and processing methods based on the spin degree of freedom of charged particles. This will be essential as a first step towards a solid state implementation of a quantum computer; see, e.g. D. D. Awschalom and J. M. Kikkawa, Phys. Today 52, No. 6, 33 (1999).

There has been considerable work on achieving spin-polarized currents in semiconductors using transport in the presence of magnetic impurities, see M. Oestreich et al. Appl. Phys. Lett. 74, 1251 (1999), R. Fiederling et al., Nature (London) 402, 787, (1999) and Y. Ohno et al., Nature (London) 402, 790, (1999), or using injection of carriers from a ferromagnetic contact, see P. R. Hammar et al., Phys. Rev. Lett. 83, 203 (1999), and S. Gardelis et al., Phys. Rev. B 60, 7764 (1999). In these cases a voltage applied across the semiconductor drives the spin current.

It is known that spin-polarized carriers can be optically injected into a semiconductor using circularly polarized light, see U.S. Pat. No. 3,968,376, and M. I. Dyakonov and V. I. Perel, in *Optical Orientation*, edited by F. Meier and B. P. Zakharchenya, Modern Problems in Condensed Matter Sciences, Vol. 8 (North-Holland, Amsterdam, 1984), Chapter 2. A spin current may be generated from these spin-polarized carriers by applying a voltage across the semiconductor, see D. Hagele et al., Appl. Phys. Lett. 73, 1580 (1980), and J. M. Kikkawa and D. D. Awschalom, Nature (London) 397, 139 (1999).

All of the above methods use a voltage difference to move the carriers (electrons and holes), and hence there is always an electrical current as well as a spin current. As well, the spin currents can only be modulated as fast as the voltage difference can be modulated.

U.S. Pat. No. 5,790,296 discloses a method for generating and controlling an electrical current in a semiconductor using the interference between multiple laser beams. This patent is restricted to the ways in which multiple light beams can be used to generate and control electrical currents, and does not discuss how to generate and control spin-polarized currents.

A single, elliptically polarized optical beam can be used to generate and control an electrical current in a semiconductor, only when the material has low enough symmetry (see, N. Laman, A. I. Shkrebtil, J. E. Sipe, and H. M. van Driel, Appl. Phys. Lett. 75, 2581 (1999)). In that case the current is controlled by the degree of elliptical polarization of the beam.

The production of pure spin currents have been discussed in the case of intersubband transitions in S. D. Ganichev, E. L. Ivchenko, S. N. Danilov, J. Eroms, W. Wegscheider, D. Weiss, and W. Prettl, Phys. Rev. Lett. 86, 4358 (2001. However, a drawback to this technique is that it requires a specially structured semiconductor material (quantum well) and can only be used at cryogenic temperatures with a far infrared laser.

It would therefore be very advantageous to provide a method of generating polarized spin currents in photoconductors that can be modulated on ultrafast timescales without the need for a bias voltage to be applied. It would also be advantageous to be able to use be able to generate spin currents using interband transitions (connecting valence and conduction bands) so that visible or near visible lasers could be used and so the use of far infrared lasers is not required, which could be accomplished at useful at room temperature and does not require artifical structuring of the semiconductor.

SUMMARY OF THE INVENTION

The present Invention provides a method of generating in photoconductors polarized spin currents that can be modulated on ultrafast timescales without the need for a bias voltage to be applied to the photonconductor.

In one aspect of the invention there is provided a method of generating spin currents in a photoconductor material, the method comprising the steps of:

producing a first coherent light beam having a first frequency $\omega_1$ and a second coherent light beam having a frequency twice the first frequency $2\omega_1$ polarizing said first and second coherent light beams to have a preselected polarization with respect to each other, and simultaneously irradiating a selected region of the photoconductor material with said first coherent light beam and said second coherent light beam to excite charge carriers from a first energy band across a bandgap to another energy band thereby generating a spin current in said photoconductor having a direction and magnitude determined by the relative polarization of said first and second coherent light beams.

The present invention is not restricted to a requirement for two coherent light beams. Thus, in anther aspect of the invention there is provided a method of generating spin currents in a photoconductor material material having a bandgap energy separating two energy bands, the method comprising the steps of:

producing at least three coherent light beams of frequencies $\omega_1$, $\omega_2$, and $\omega_3$, such that $\omega_1 = \omega_2 + \omega_3$, polarizing each of said at least three coherent light beams to have a preselected polarization with respect to the other coherent light beams, at least $\omega_1$ having sufficient energy to excite charge carriers across the bandgap, and simultaneously irradiating a selected region of the photoconductor material with said at least three coherent light beams to generate a spin current in said photoconductor having a direction and magnitude determined by the relative polarization of said coherent light beams.

In the above aspects of the invention the method may include adjusting a phase relationship between the coherent light beams to change the direction of the spin current generated in the photoconductor.

In another aspect of the invention, the present invention provides a method of using a single optical beam with a degree of elliptical polarization incident on a semiconductor of low symmetry to achieve a spin current that can be generated and controlled by the degree of elliptical polarization. More particularly, in this aspect of the present invention there is provided a method of of generating spin currents in a photoconductor material which has a bandgap energy and non-centrosymmetric crystal symmetry, comprising the steps of:

illuminating a photoconductor material having a non-centrosymmetric crystal symmetry with a coherent light beam having a pre-selected degree of elliptical polarization and an effective photon beam energy and effective intensity to optically excite charge carriers from one energy band across said bandgap into another energy band, thereby generating a spin current in said photoconductor having a direction and magnitude determined by the degree of elliptical polarization of said coherent light beam.

BRIEF DESCRIPTION OF THE DRAWINGS

Preferred embodiments of the invention will now be described, by way of example only, with reference to the drawings, in which.

DETAILED DESCRIPTION OF THE INVENTION

As used herein, the term "spin current" means a current of charges (such as electrons and holes) which are spin polarized. The present method, in one embodiment, utilizes the quantum interference of one- and two-photon absorption processes in a light field produced preferably by multiple laser beams. Spin currents can be produced with or without accompanying net electrical currents depending on the polarization of the beams with respect to each other. The magnitude and direction of the spin currents are determined by the phase difference between multiple laser beams, and the polarization of the beams.

The spin current is denoted by the second rank pseudotensor $K^{ab} = \langle S^a v^b \rangle$ where $\langle S^a v^b \rangle$ denotes the average of the product of carrier spin and velocity, the vector S is the carrier spin, and the vector v is the carrier velocity. Superscript letters denote Cartesian components of vectors or tensors, and can take on one of the values x, y, or z. Without limiting the invention, we expect the spin current satisfies $$K^{ab} = (\xi^{abcde}(E_{\omega 1}{}^c) E_{\omega 2}{}^d E_{\omega 3}{}^e + c.c.) - K^{ab}/T \quad (1)$$

where $E_{\omega 1}$, $E_{\omega 2}$, and $E_{\omega 3}$ are the (complex) field vector amplitudes of the beams, K is the time rate of change of the spin current pseudotensor, $\xi$ is a fifth rank material response pseudotensor, and T is a phenomenological relaxation time.

For materials with cubic or isotropic symmetry, $\xi$ can be written in terms of only four parameters $C_{1-4}$ as $$\xi^{abcde} = C_1(\delta^{ad}\epsilon^{bce} + \delta^{ae}\epsilon^{bed}) + C_2(\delta^{bd}\epsilon^{ace} + \delta^{be}\epsilon^{acd}) + C_3\delta^{de}\epsilon^{abc} + C_4(\delta^{cd}\epsilon^{abc} + \delta^{ce}\epsilon^{abd})$$

where $\delta^{ab}$ is a Kronecker delta, and $\epsilon^{abc}$ the Levi-Cevita tensor. There are two cases of interest for these materials. We will assume the beams are co-propagating along the z-axis. The first case is where the beams are cocircularly polarized all having the same circular polarization. In this case, there is a net current from the interference of the beams as described in U.S. Pat. No. 5,790,296. The electrical current is in the plane perpendicular to the beam propagation direction, and its direction in that plane depends on the relative phase of the beams. Calling that direction m, we have $$\hat{m} = \hat{x}\sin(\Delta\phi) \pm \hat{y}\cos(\Delta\phi)$$

where the top sign is for right-circularly polarized beams and the bottom sign is for left-circularly polarized beams, and $$\Delta\phi = \phi_{\omega 2} + \phi_{\omega 3} - \phi_{\omega 1}$$

The optically injected carriers have a net spin along the axis of propagation of the coherent light beams, thus the current is spin polarized. Even though the carriers should only be 50% spin polarized, the current can have a higher degree of spin polarization: 57% for GaAs, see R. D. R. Bhat and J. E. Sipe Phys. Rev. Lett. 85, 5432 (2000). There will also be a spin current such that the spin component along m of carriers with a component of motion along positive z will be opposite to the spin component along m of carriers with a component of motion along negative z. This is a pure spin current, since there is no electrical current along the z direction. FIG. 3(a) shows a schematic illustration of the net electron motion for with both beams right circularly polarized using the apparatus of FIG. 2 discussed hereinafter.

The second case of interest is when the beams have crossed linear polarization, such that for example, the $\omega_1$ beam is polarized along y, while the other two beams are polarized along x. In this case, there is no net spin polarization of the carriers, but there are spin currents nonetheless. The electrical current as described in U.S. Pat. No. 5,790,296 (which is incorporated herein in its entirety) is in the direction of the polarization of the $\omega_1$ beam and its magnitude depends sinusoidally on $\Delta\phi$. In the present invention there are pure spin currents perpendicular to the electrical current. Carriers with a component of motion along positive x will have their spin along z opposite to carriers with a component of motion along negative x. Also carriers with a component of motion along positive z will have their spin along x opposite to carriers with a component of motion along negative z. Both of these pure spin currents will have a magnitude which depends on the cosine of $\Delta\phi$. FIG. 3(b) shows a schematic illustration of the net electron motion obtained with the cross-polarized coherent light beams using the apparatus of FIG. 1 discussed hereinafter.

The two cases described above for cubic or isotropic materials are illustrative important examples. In general the beams need not be co-propagating, and other polarization combinations may be used. Further, the above described embodiments of the method for producing spin currents does not rely on any specific crystal symmetry so that materials of different symmetry could be used. In the general case, the spin current is contemplated by the inventors to still be well described by equation (1). Further, it is contemplated that spin currents can be produced in materials having nanostructure geometries using the method disclosed herein.

The optical frequency of the beam must be large enough for the energy of one photon to exceed the band gap so that in the multiple beam method for generating spin currents the light beams produce interband transitions, between for example the valence and conduction bands. When two beams of frequency $\omega_1$ and $\omega_2$ are used, it is preferably the $\omega_2$ beam that must have enough energy to cross the bandgap. The effect should still occur if $\omega_1$ has enough energy to also excite carriers across the bandgap, but this is not an ideal or preferred case as it will lead to too many background carriers.

Even more generally, one could replace any one of the beams by one or more beams of lower frequency but higher intensity such that the role of each photon from the original beam is taken on by an odd number of photons from the new beams. For example, a beam of frequency $\omega_2$ may be replaced by two beams of frequencies $\omega_A=\omega_2/3$ and $\omega_B=2\omega_2/3$, so that the role of each photon of frequency $\omega_2$ is replaced by two photons of frequency $\omega_A$ and one of frequency $\omega_B$. A multiphoton absorption process then occurs, connecting valence and conduction band states.

Figure 1:
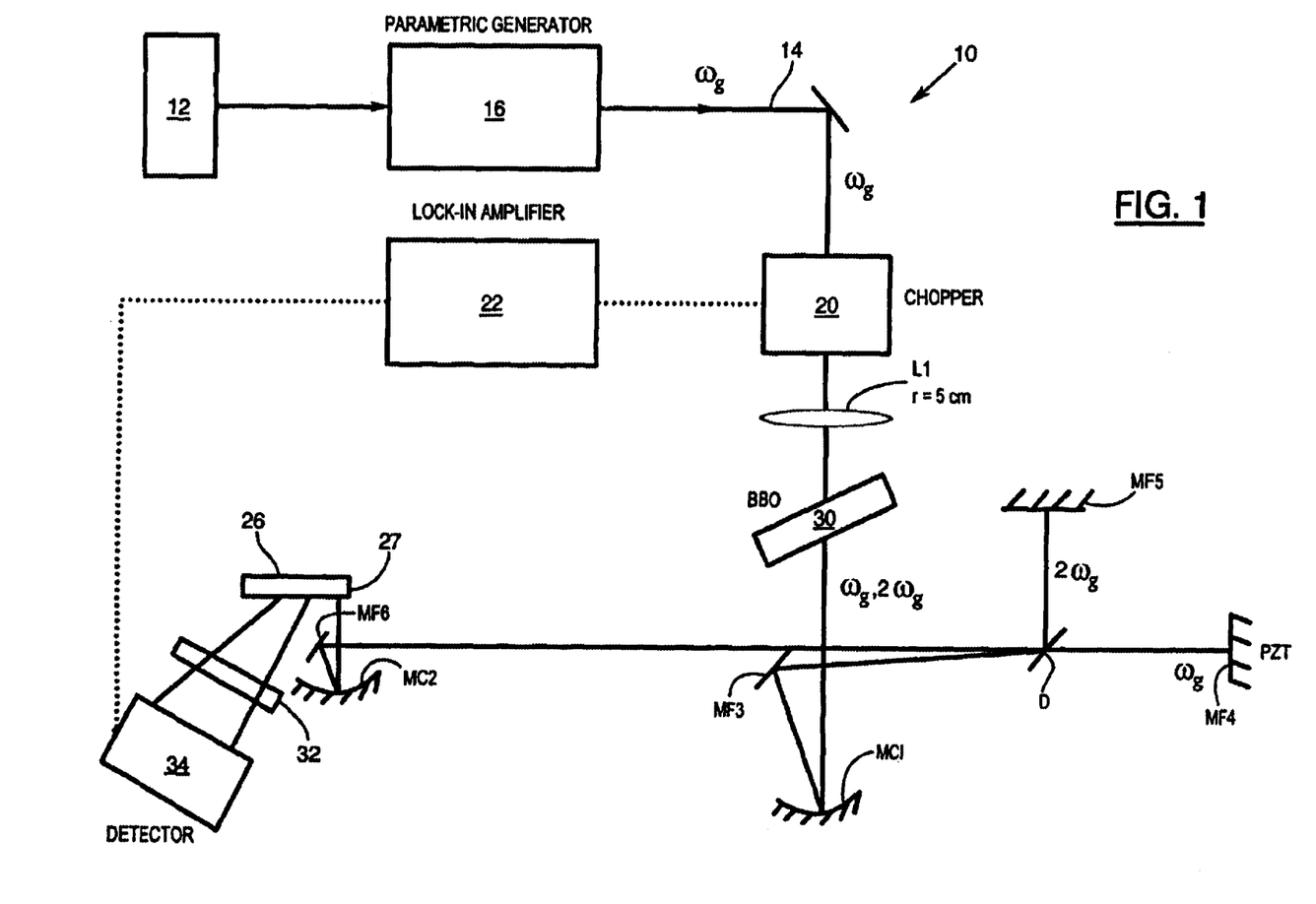
FIG. 1 shows a block diagram of an apparatus used to produce spin currents using two coherent light beams in accordance with the present invention.

An apparatus 10 for producing spin current in a two color field using two coherent light beams of frequency $\omega_g$ and $2\omega_g$ is shown in FIG. 1. A light source 12 produces a coherent light beam 14, such as a laser beam. An example source 12 may be an actively mode locked picosecond Ti:sapphire laser operating at 800 nm with a corresponding frequency $\omega_g$. The first beam $\omega_g$ pumps an optical parametric generator 16. A lens L1 having a focal length of f=5 cm focuses the light beam $\omega_g$ passing through the chopper 20 onto a 1 mm thick β-barium borate (BBO) crystal 30 using type I phase matching which generates a second beam (hereinafter $2\omega_g$) as the second harmonic of the first beam $\omega_g$.

The two beams $\omega_g$ and $2\omega_g$ are focused by curved mirror MC1 to the flat mirror MF3, which directs the two beams to the planar dichroic mirror D set at an angle of 45 degrees with respect to the direction of the beams. The $\omega_g$ beam is transmitted by dichroic plate D, whereupon it is back-reflected by flat mirror MF4 that can be translated by a piezoelectric transducer (PZT) to control the relative phase of the two beams. The $2\omega_g$ beam is simply reflected by D and then back-reflected by flat mirror MF5. The two beams are reflected off ($2\omega_g$), and transmitted through ($\omega_g$), dichroic mirror D towards planar mirror MF6 which reflects both beams onto curved mirror MC2 which in turn focuses both beams onto a selected area on photoconductor 26. The two beams, after being back-reflected from MF5 and MF4 off, and through D, will have crossed linear polarizations with respect to each other.

The two cross-polarized beams $\omega_g$ and $2\omega_g$ are focused onto the surface close to one side of the photoconductor 26, and a polarizer 32 is placed in front of the photoconductor 26 to analyze the polarization of the luminescence emitted from the photoconductor. The luminescence is collected by a photodetector 34 that is connected to the lock-in amplifier 22. Apparatus 10 includes a chopper 20 connected to a lock-in amplifier 22. In combination the chopper 20 and lock-in amplifier 22 average the signals produced by the coherent light beams. Detection of the polarization of the luminescence will in effect measure the spin current because the carriers scattering off the edge 27 of the photoconductor 26 will have their spins randomized. Those spin-polarized carriers moving in the opposite direction in photoconductor 26 away from edge 27 will not have their spins randomized as quickly, and thus if the spins moving in the opposite direction have opposite spins, the result will be a net spin polarization of the carriers that will be seen through the degree of circular polarization of the luminescence emitted from the photoconductor.

Other polarization combinations can also be realized. For example, referring to FIG. 2, co-circularly polarized beams are produced by modifying the apparatus of FIG. 1 to give apparatus 40 by the addition of a $\lambda/8$ waveplate 42 into the optical circuit between dichroic mirror D and mirror MF4 through which the $\omega_g$ beam is transmitted twice and a $\lambda/8$ waveplate 44 between dichroic mirror D and mirror MF5 through which the $2\omega_g$ beam is transmitted twice.

It will be appreciated by those skilled in the art that the system shown in FIGS. 1, 2 and 3 (discussed hereinafter) use chopped light beams only as an aid in detecting the spin currents since chopping in combination with the lock-in detection system provides greater detection sensitivity than achievable without chopping or AC coupling. This chopping or illumination with an AC coherent light source is not essential to the method and polarized spin currents can be obtained using direct steady state illumination.

Figure 2:
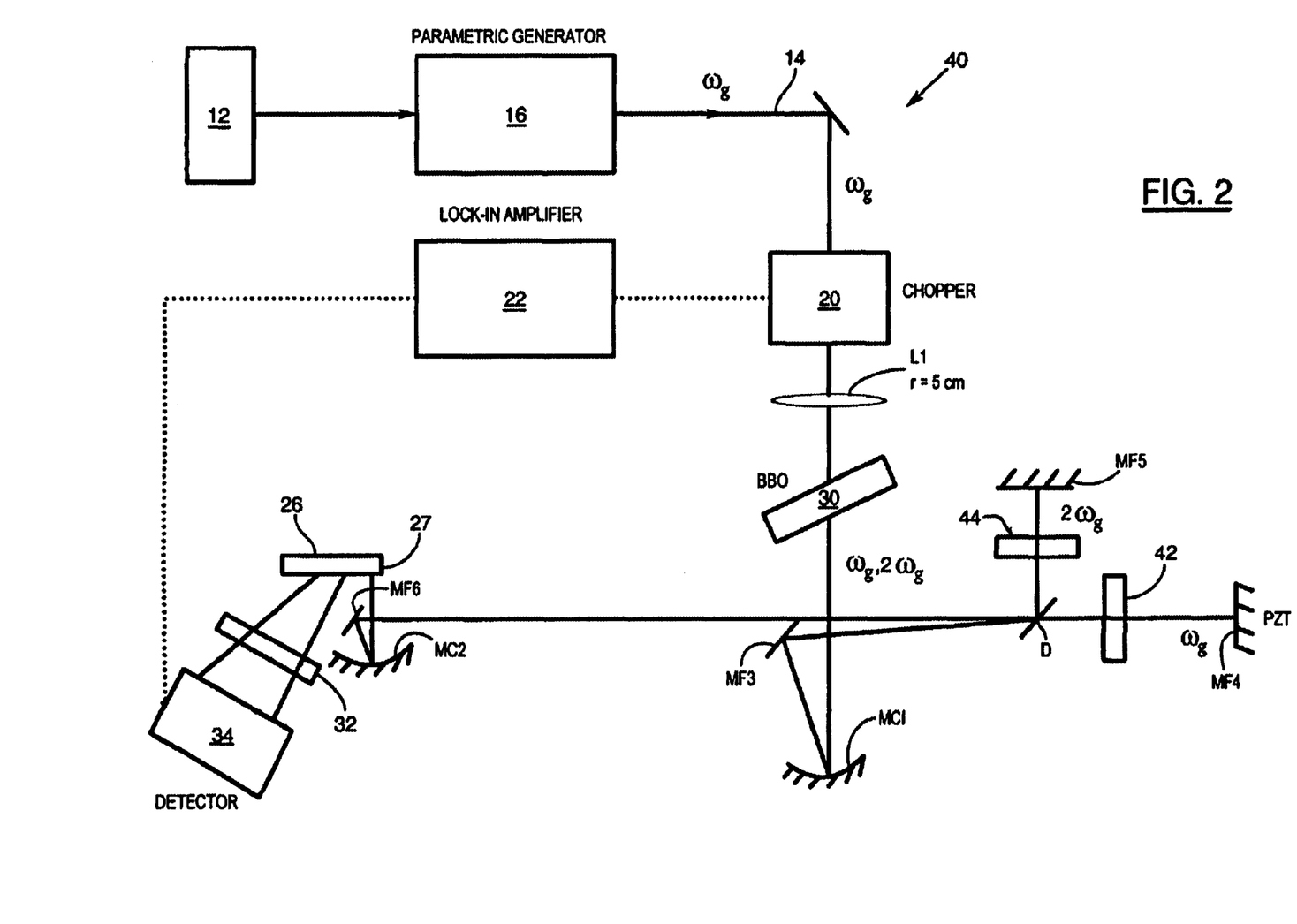
FIG. 2 shows an alternative embodiment of an apparatus used to produce spin currents using two coherent light beams.
Figure 3:
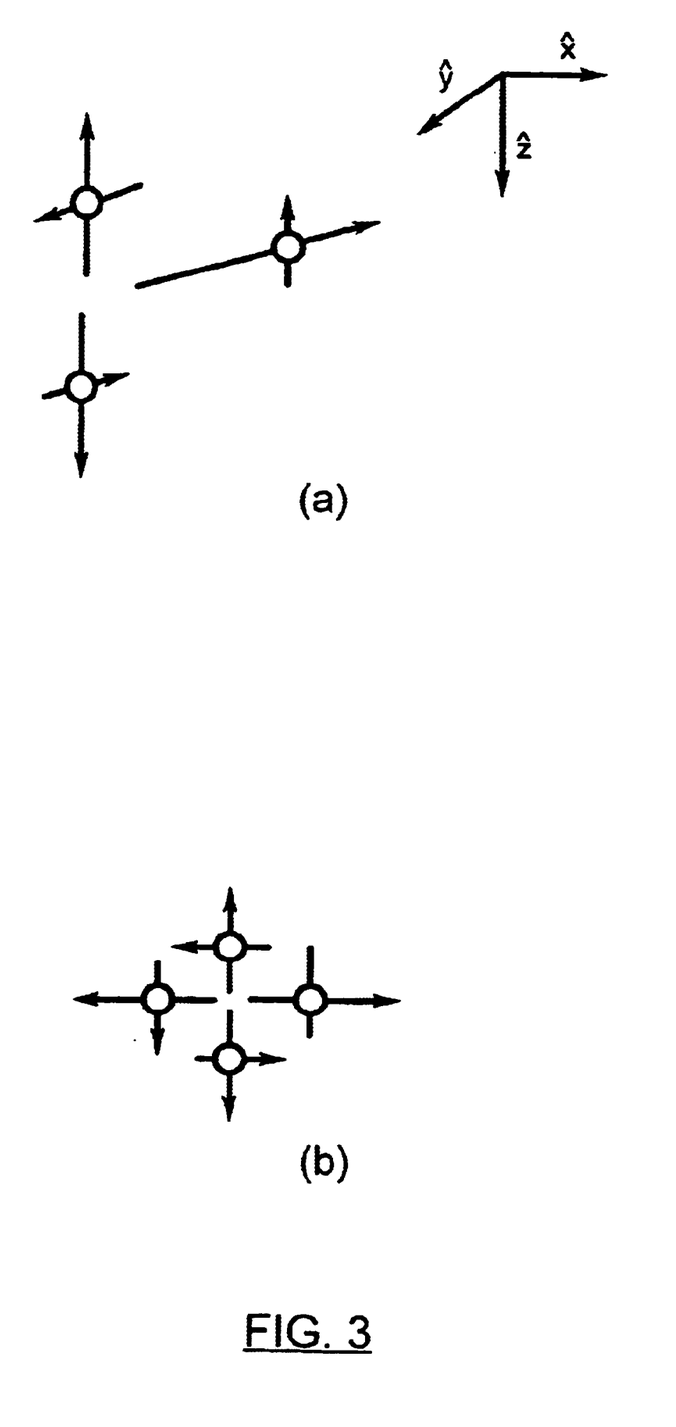
FIG. 3 shows schematic illustrations of the net electron motion for (a) the case with both beams right circularly polarized using the apparatus of FIG. 2, and (b) the case with the coherent light beams cross-polarized.

The embodiments of the apparatus shown in FIGS. 1 and 2 for producing spin currents used only two beams, such that one has twice the frequency of the other. However, the method of producing spin currents in accordance with the present invention may be implemented in general with three beams of frequencies $\omega_1$, $\omega_2$, and $\omega_3$ such that $\omega_1=\omega_2+\omega_3$. The magnitude of the frequencies should be such that the beam with largest frequency has a photon energy that is large enough to excite carriers across the bandgap of the photoconductor. If the photon energy is too large such that it can excite carriers from the spin-orbit split-off band, the magnitude of the effect will be decreased. Stated another way, In this embodiment part where there are three beams $\omega_1=\omega_2+\omega_3$ used, it is $\omega_1$ that must have sufficient energy to excite carriers cross the bandgap.

While using multiple coherent light beams such as laser beams is a preferred embodiment, the method of the present invention may also be achieved using single optical pulses short enough to give the required bandwidth that contain within the pulses the multiple frequency components required to give the same effect achieved using multiple laser beams.

Figure 4:
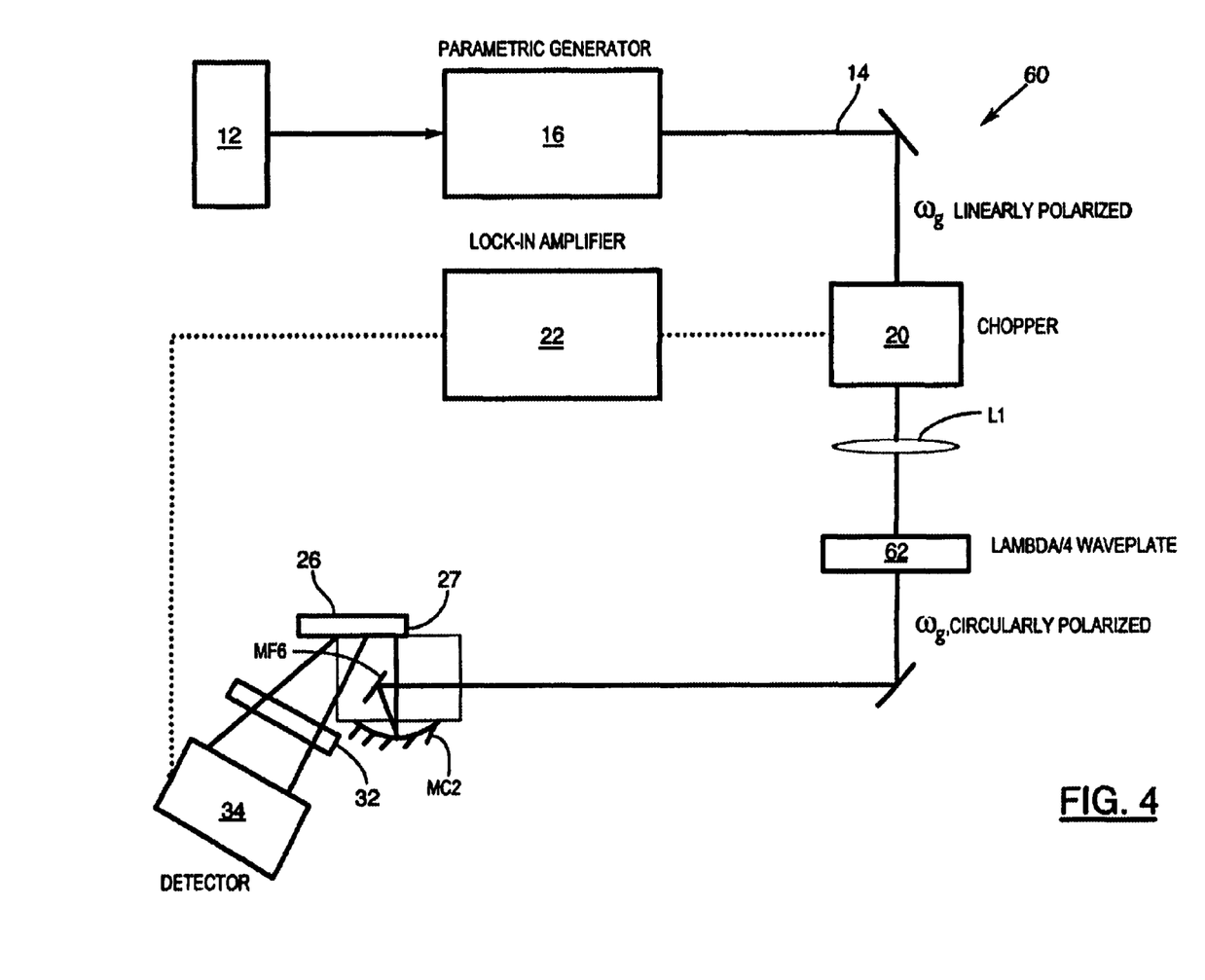
FIG. 4 is a block diagram of an apparatus for generating spin currents in certain types of low symmetry photoconductors using a single coherent laser beam using elliptically or circularly polarized light.

In another embodiment of the process for generating spin currents, a single coherent light beam may be used to produce spin currents in certain types of low symmetry photoconductors. In this case a single optical beam with a degree of elliptical polarization incident on a semiconductor of low symmetry produces a spin current that can be generated and controlled by the degree of elliptical polarization. FIG. 4 shows a block diagram of an apparatus shown generally at 60 for implementing the one single beam version. A light source 12 produces a coherent light beam 14, such as a laser beam. An example source 12 may be an actively mode locked picosecond Ti:sapphire laser operating at 800 nm with a corresponding frequency $\omega_g$, The first beam $\omega_g$ pumps an optical parametric generator 16. A lens L1 focuses the light beam $\omega_g$ passing through the chopper 20 onto a quarter wave plate 62 used to convert linear to elliptically (ideally circularly) polarized light. The quarter wave plate 62 is mounted on a motorized rotation stage (not shown) for rotating wave plate 62 in order to vary the degree of elliptical polarization.

The circularly or elliptically polarized beam $\omega_g$ is directed to curved mirror MC2 which in turn focuses both beams onto a selected area on photoconductor 26. As with the apparatus of FIGS. 1 and 2, a polarizer 32 is placed in front of the photoconductor 26 to analyze the polarization of the luminescence emitted from the photoconductor. The luminescence is collected by a photodetector 34 that is connected to the lock-in amplifier 22. Apparatus 60 includes a chopper 20 connected to a lock-in amplifier 22. In combination the chopper 20 and lock-in amplifier 22 average the signals produced by the coherent light beams. Detection of the polarization of the luminescence will in effect measure the spin current because the carriers scattering off the edge 27 of the photoconductor 26 will have their spins randomized. Those spin-polarized carriers moving in the opposite direction in photoconductor 26 away from edge 27 will not have their spins randomized as quickly, and thus if the spins moving in the opposite direction have opposite spins, the result will be a net spin polarization of the carriers that will be seen through the degree of circular polarization of the luminescence emitted from the photoconductor.

The single beam version requires a semiconductor with a crystal structure that is non-centrosymmetric. In this case, the equation for the spin current is expected to follow the equation:

$$K^{ab} = (\zeta^{abcd}(E_\omega^c)^* E_\omega^d) - K^{ab}/T$$

The pseudotensor zeta will be non-zero, only for materials that lack a center of inversion symmetry. In order to generate a spin current along with an electrical current requires the semiconductor to be non-centrosymmetric but not of the zincblende structure ($T_d$ point group) The wurtzite structure ($C_{6v}$ point group), for example, has a symmetry that allows a spin current along with an electrical current. The optical frequency of the beam must be large enough for the energy of one photon to exceed the band gap. Alternatively, the frequency could be lowered, and the intensity increased, so that the role of each photon is replaced by more than one photons of lower frequency. A multiphoton absorption process then occurs, connecting valence and conduction band states. The direction and magnitude of the spin current is controlled by the degree of elliptical (ideally circular) polarization of the beam, which is varied by rotation of quarter waveplate 62.

In the zincblende ($T_d$ symmetry), a pure spin current but no electrical current is obtained with the single beam case. Of the 32 crystal classes, 21 lack center of inversion symmetry. Of these 21 crystal classes, only 3 will result in no electrical current in the single beam case. Those are: 6[bar]m2, 6[bar] and 4[bar]3[bar]m. (The notation x[bar] means there is a bar above the number x which is the 'international' naming for symmetry groups. The notation used above ($T_d$ and $C_{6v}$) is the Schoenflies naming. $T_d$ is the same as 4[bar]3[bar]m. $C_{6v}$ is the same as 6 mm.) The spin currents produced for single beam illumination will be present for any material that lacks a center of inversion symmetry, i.e. for those 21 crystal classes.

The present method for producing and controlling spin currents using elliptically or circularly polarized light using a single optical beam is a significant improvement over current methods of producing spin currents because the method can be used to generate spin currents at room temperature, can be implemented with visible or near visible lasers and does not require artifical structuring of the semiconductor. As used herein, the term circular polarization is a special case of elliptical polarization.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A method of generating spin currents in a photoconductor material, the method comprising the steps of:
producing a first coherent light beam having a first frequency $\omega_1$ and a second coherent light beam having a frequency twice the first frequency $2\omega_1$, polarizing said first and second coherent light beams to have a preselected polarization with respect to each other, and simultaneously irradiating a selected region of the photoconductor material with said first coherent light beam and said second coherent light beam to excite charge carriers from a first energy band across a bandgap to another energy band thereby generating a spin current in said photoconductor having a direction and magnitude determined by the relative polarization of said first and second coherent light beams.

2. The method according to claim 1 including adjusting a phase relationship between the first and second coherent light beams to change the direction of the spin current generated in said photoconductor.

3. The method according to claim 1 wherein said first coherent light beam and said second coherent light beam are copropagating.

4. The method according to claim 2 wherein said first coherent light beam and said second coherent light beam are copropagating.

5. The method according to claim 4 wherein said copropagating first and second coherent light beams are linearly cross-polarized, and wherein said spin current is a pure spin current in which spin is transported but not electrical current.

6. The method according to claim 4 wherein said copropagating first and second coherent light beams are circularly polarized in the same direction, and wherein said spin current includes a pure spin current in the direction of propagation of the coherent light beams and a spin polarized electrical current in which both spin and electrical charge are transported in a direction perpendicular to the direction of propagation of the coherent light beams.

7. The method according to claim 6 wherein said first and second circularly polarized coherent light beams are right circularly polarized.

8. The method according to claim 6 wherein said first and second circularly polarized coherent light beams are left circularly polarized.

9. The method according to claim 4 wherein said copropagating first and second coherent light beams are colinearly polarized.

10. The method according to claim 1 wherein said photoconductor is a semiconductor.

11. The method according to claim 1 wherein said photoconductor has a nanostructure geometry.

12. A method of generating spin currents in a photoconductor material having a bandgap energy separating two energy bands, the method comprising the steps of:

producing at least three coherent light beams of frequencies $\omega_1$, $\omega_2$, and $\omega_3$, such that $\omega_1=\omega_2+\omega_3$, polarizing each of said at least three coherent light beams to have a preselected polarization with respect to the other coherent light beams, at least $\omega_1$ having sufficient energy to excite charge carriers across the bandgap, and simultaneously irradiating a selected region of the photoconductor material with said at least three coherent light beams to generate a spin current in said photoconductor having a direction and magnitude determined by the relative polarization of said coherent light beams.

13. The method according to claim 12 including adjusting a phase relationship between said at least three coherent light beams to change the direction of the spin current generated in said photoconductor.

14. The method according to claim 12 wherein said at least three coherent light beams are copropagating.

15. The method according to claim 13 wherein said at least three coherent light beams are copropagating.

16. The method according to claim 12 wherein said photoconductor is a semiconductor.

17. The method according to claim 12 wherein said photoconductor has a nanostructure geometry.

18. A method of generating spin currents in a photoconductor material which has a bandgap energy and non-centrosymmetric crystal symmetry, comprising the steps of:

illuminating a photoconductor material having a non-centrosymmetric crystal symmetry with a coherent light beam having a pre-selected degree of elliptical polarization and an effective photon beam energy and effective intensity to optically excite charge carriers from one energy band across said bandgap into another energy band, thereby generating a spin current in said photoconductor having a direction and magnitude determined by the degree of polarization of said coherent light beam.

19. The method according to claim 18 wherein said effective photon beam energy includes said photon beam having a photon beam energy greater than or equal to said bandgap energy of said photoconductor for optically exciting charge carriers from said one energy band across said bandgap into said another energy band in a single photon absorption process.

20. The method according to claim 18 wherein said effective photon beam energy is smaller than said bandgap energy, and wherein said effective photon beam has a beam intensity sufficiently high to excite charge carriers across said bandgap in a multiphoton absorption process.

21. The method according to claim 18 wherein said degree of elliptical polarization is adjustable for controlling a direction and magnitude of the spin current.

22. The method according to claims 19 wherein said degree of elliptical polarization is adjustable for controlling a direction and magnitude of the spin current.

23. The method according to claim 18 wherein the polarization of said coherent light beam is continuously adjustable between left circularly polarized light and right circularly polarized light.

24. The method according to claim 18 wherein said photoconductor has a zincblende ($T_d$ symmetry), and wherein a pure spin current but no electrical current is produced.

25. The method according to claim 18 wherein said photoconductor has a wurtzite structure, and wherein a spin current and an electrical current are produced.

26. The method according to claim 18 wherein said coherent light beam is produced using a visible or near visible laser.

27. The method according to claim 18 wherein said photoconductor is a semiconductor.

28. The method according to claim 18 wherein said photoconductor has a nanostructure geometry.

* * * * *